(12) United States Patent
Matsushima (10) Patent No.: US 9,705,954 B2
(45) Date of Patent: Jul. 11, 2017

(54) RELAYING DEVICE, COMMUNICATION SYSTEM, AND COMMUNICATION METHOD

(71) Applicant: Icom Incorporated, Osaka (JP)

(72) Inventor: Hisaaki Matsushima, Osaka (JP)

(73) Assignee: Icom Incorporated, Osaka (JP)

( * ) Notice: Subject to any disclaimer, the term of this patent is extended or adjusted under 35 U.S.C. 154(b) by 0 days.

(21) Appl. No.: 15/296,735

(22) Filed: Oct. 18, 2016

(65) Prior Publication Data

US 2017/0041370 A1  Feb. 9, 2017

Related U.S. Application Data

(63) Continuation of application No. 14/038,018, filed on Sep. 26, 2013, now Pat. No. 9,503,910.

(30) Foreign Application Priority Data

Dec. 26, 2012  (JP) ................................. 2012-283575

(51) Int. Cl.
*H04L 29/06* (2006.01)
*H04B 7/15* (2006.01)
(Continued)

(52) U.S. Cl.
CPC ............. *H04L 65/605* (2013.01); *H04B 3/36* (2013.01); *H04B 7/15* (2013.01); *H04L 67/2852* (2013.01);
(Continued)

(58) Field of Classification Search
None
See application file for complete search history.

(56) References Cited

U.S. PATENT DOCUMENTS

2003/0224825 A1  12/2003  Cox et al.
2004/0219940 A1  11/2004  Kong et al.
(Continued)

FOREIGN PATENT DOCUMENTS

JP  4074633 B  6/2006
JP  2009232430 A  10/2009
(Continued)

OTHER PUBLICATIONS

European Search Report of EP 13195672, which is a corresponding EP application of U.S. Appl. No. 14/038,018, mailed May 6, 2014.

*Primary Examiner* — Olumide T Ajibade Akonai
*Assistant Examiner* — Margaret G Mastrodonato
(74) *Attorney, Agent, or Firm* — Muncy, Geissler, Olds & Lowe, P.C.

(57) ABSTRACT

A relaying device is provided, which can mediate by using communications of a wireless apparatus without clipping off the beginning of verbal communication. The relaying device includes: a network interface that receives an audio signal as a group of packet trains via a network; a wireless apparatus interface to which a wireless apparatus is connected; a voice buffer that temporarily stores the audio signal; and a control unit that starts temporarily storing the audio signal in the voice buffer and requests the wireless apparatus to reserve a channel, when a leading packet of the group of packet trains is received, and that reads the temporarily stored audio signal from the voice buffer and transfers the audio signal to the wireless apparatus, after receiving from the wireless apparatus a reply indicating that a channel has been reserved.

6 Claims, 10 Drawing Sheets

| Local Station IP Address | 192.168.0.qq |
|---|---|
| Communication Port Number | 5000q |

⌐200
⌐201

Destination Management Table ⌐202

| Calling Information | | Destination Information Of Relaying Device | | CODEC |
|---|---|---|---|---|
| ID Type | ID | IP Address | Port Number | |
| Individual | 0002 | 192.168.0.zz | 5000z | AMBE |
| Individual | 0003 | 192.168.0.vv | 5000v | G.711 |
| Group | 01 | 192.168.0.xx | 5000x | - |
| | | 192.168.0.zz | 5000z | - |
| Group | 02 | 192.168.0.yy | 5000y | - |

(51) Int. Cl.
  *H04B 3/36* (2006.01)
  *H04L 29/08* (2006.01)
  *H04W 4/10* (2009.01)
  *H04W 16/26* (2009.01)
  *H04W 72/04* (2009.01)

(52) U.S. Cl.
  CPC ............ *H04W 4/10* (2013.01); *H04W 16/26* (2013.01); *H04W 72/04* (2013.01)

(56) References Cited

U.S. PATENT DOCUMENTS

| | | |
|---|---|---|
| 2006/0229093 A1 | 10/2006 | Bhutiani |
| 2007/0195735 A1 | 8/2007 | Rosen et al. |
| 2009/0004996 A1* | 1/2009 | Peleg .................... H04L 65/605 455/403 |

FOREIGN PATENT DOCUMENTS

| | | |
|---|---|---|
| JP | 2011-135289 A | 7/2011 |
| JP | 2011-135290 A | 7/2011 |
| JP | 2011-135291 A | 7/2011 |
| WO | 2004/098094 A1 | 5/2004 |

* cited by examiner

| Local Station ID | 0001 |
|---|---|
| Agroup To Which The Local Station Pertains | 02, 03 |

Fig.7

| Local Station IP Address | 192.168.0.qq |
|---|---|
| Communication Port Number | 5000q |

Destination Management Table

| Calling Information | | Destination Information Of Relaying Device | | CODEC |
|---|---|---|---|---|
| ID Type | ID | IP Address | Port Number | |
| Individual | 0002 | 192.168.0.zz | 5000z | AMBE |
| Individual | 0003 | 192.168.0.vv | 5000v | G.711 |
| Group | 01 | 192.168.0.xx | 5000x | - |
| | | 192.168.0.zz | 5000z | - |
| Group | 02 | 192.168.0.yy | 5000y | - |

Fig.8

RELAYING DEVICE, COMMUNICATION SYSTEM, AND COMMUNICATION METHOD

CROSS REFERENCE TO RELATED APPLICATIONS

This application is a continuation of U.S. application Ser. No. 14/038,018 filed on Sep. 26, 2013, which is based on and claims priority to Japanese Patent Application No. 2012-283575 filed on Dec. 26, 2012, the disclosures of which are incorporated herein by reference.

BACKGROUND OF THE INVENTION

1. Field of the Invention

The present invention relates to a relaying device that mediates communications between wireless apparatuses over a network.

2. Description of the Related Art

A relaying device that mediates communications over a network such as a LAN, for example, so that transceivers in areas where radio waves do not reach each other of the transceivers can perform communications (see Japanese Unexamined Patent Application Publication No. 2011-135291, for example). The relaying device in Japanese Unexamined Patent Application Publication No. 2011-135291 is a device configured to cause a repeater as a wireless relaying apparatus to enter a transmission state (turning PTT ON) upon receiving an audio signal (audio packets) from the network, and configured to transfer the received audio signal to the repeater.

Upon receiving a PTT-ON signal from the relaying device, the repeater first reserves a channel (wireless communication channel), and then starts sending the audio signal. In this case, specifically, the repeater cannot send the audio signal immediately upon receiving the PTT-ON signal. Even if an idle channel is present, the repeater spends time of 100 ms or so to perform a processing of reserving a channel. If no idle channel is then present, the repeater needs to wait for any idle channel to become available.

However, as described above, a typical relaying device is configured to send an audio signal simultaneously with a PTT-ON signal, and thus a part of the audio signal received in a period required to reserve a channel is discarded without being sent to a transceiver at the other end. As a result, there was a problem that the beginning of the received audio signal is clipped off in a wireless apparatus at the other end.

SUMMARY OF THE INVENTION

An object of the present invention is to provide a relaying device that is capable of mediating communications of a wireless apparatus over a network without clipping off the beginning of verbal communications.

A relaying device according to the present invention includes: a network interface receiving an audio signal as a group of packet trains over a network; a wireless apparatus interface to which a wireless apparatus is connected; a voice buffer that temporarily stores the audio signal; and a control unit. When receiving a leading packet of the group of packet trains, the control unit starts temporarily storing the audio signal in the voice buffer, and requests the wireless apparatus to reserve a channel (wireless communication channel). After receiving, from the wireless apparatus, a reply indicating that a channel has been reserved, the control unit reads the temporarily stored audio signal from the voice buffer, and transfers this audio signal to the wireless apparatus.

In the above-described invention, in the case where the control unit has not received a reply from the wireless apparatus over a predetermined period or longer after requesting the wireless apparatus to reserve a channel, the control unit may abort the transfer of the temporarily stored audio signal.

In addition, in the above-described invention, when a wireless apparatus equipped with an individual calling function to individually call a communication partner by using calling information is connected to the wireless apparatus interface and the calling information is contained in a received packet, the control unit may read the temporarily stored audio signal from the voice buffer and transfer it to the wireless apparatus after receiving, from the wireless apparatus, a reply indicating that a channel has been reserved and then transferring the calling information to the wireless apparatus to cause the wireless apparatus to perform individual calling.

According to the present invention, the relaying device temporarily stores an audio signal until the wireless apparatus reserves a channel and transfers the temporarily stored audio signal to the wireless apparatus when the channel becomes available for reservation. Consequently, neither the beginning of verbal communication is clipped off, nor more delay than necessary is caused since transmission of the audio signal starts simultaneously with the reservation of the channel.

DESCRIPTION OF THE PREFERRED EMBODIMENTS

Hereinafter, a description will be given of a relaying device and a communication system according to an embodiment of the present invention, with reference to the accompanying drawings. First, a basic configuration of the present invention will be described with reference to FIG. 1 to FIG. 4(B).

Figure 1:
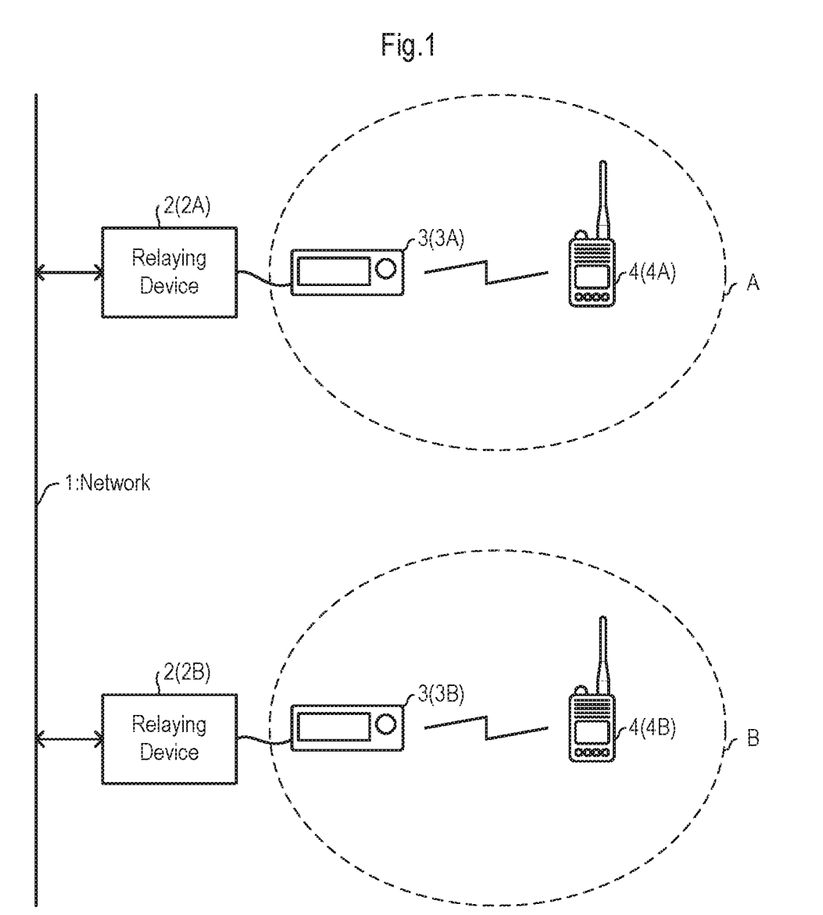
FIG. 1 shows a configuration of a communication system including relaying devices according to an embodiment of the present invention.

FIG. 1 shows a configuration of a communication system which is an embodiment of the present invention. The communication system enables communications between transceivers 4 (4A, 4B) present in different communication areas A, B by using a plurality of relaying devices 2 that are mutually connected over a network 1.

The network 1 may employ a LAN configured by Ethernet™ or the Internet. The one or more relaying devices 2 (the two relaying devices in FIG. 1) are connected to the network 1. The relaying devices (2A, 2B) cover different communication areas A and B, respectively. The relaying device 2 is connected to the repeaters 3 (3A, 3B). The repeater 3 is a stationary transceiver, which is a half-duplex communication device of so-called a push-to-talk (PTT) type. The transceivers 4 (4A, 4B) are present in the communication areas of the repeaters 3. The repeater 3 and the transceiver 4 are of a type that can communicate with each other.

The repeater 3 and the transceiver 4 are so-called digital transceivers. The digital transceiver is capable of communications of an audio signal or data or the like that is converted into a digital signal and can simultaneously communicate control information such as destination information in parallel with the communications of the audio signal. The repeater 3 packetizes a digital signal received from the corresponding transceiver 4, and enters the packetized signal into the corresponding relaying device 2. Then, the repeater 3 extracts an audio signal or control information from packets received from the corresponding relaying device 2, and converts the audio signal or the control information into respective serial digital signals to send them out.

This communication system will be described with reference to a case in which an audio signal is sent from the transceiver 4B (sending transceiver) to the transceiver 4A (receiving transceiver) in the communication system of FIG. 1. When a user of the transceiver 4B turns on a PTT switch and enters voice of a call from a microphone, this audio signal is conveyed to the repeater 3B (sending repeater) via wireless communications. The repeater 3B sends the audio signal to the relaying device 2B (sending relaying device) via wired digital communications. The relaying device 2B bundles the audio signal into RTP packets, each packet being several dozens of milliseconds, and transfers them as a packet train corresponding to length of the audio signal, to the relaying device 2A (receiving relaying device) over the network 1.

Figure 2:
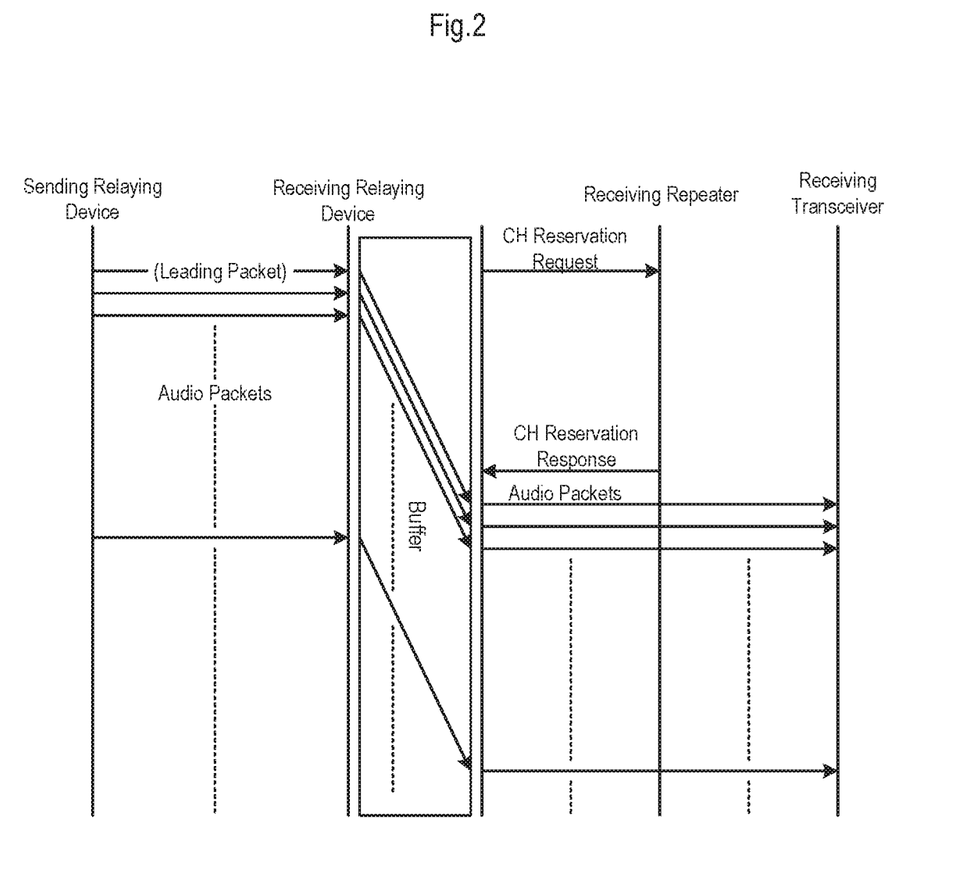
FIG. 2 is a view illustrating a sequence of sending or receiving audio signal in a communication system.

On the receiving side, this audio signal is transferred according to the procedure as shown in FIG. 2, so that the beginning of the audio signal is not clipped off in the transceiver 4A. When the relaying device 2A receives the RTP packet over the network 1, it buffers an audio signal contained in the RTP packet and requests the repeater 3A (receiving repeater) to reserve a channel (wireless communication channel). When receiving the message requesting it to reserve a channel from relaying device 2A, the repeater 3A searches for an idle channel to reserve a channel. When reserving the channel, the repeater 3A responds to the relaying device 2A that it could reserve the channel. Confirming by this response message that the channel has been reserved, the relaying device 2A reads the buffered audio signal and transfers it to the repeater 3A. The repeater 3A sends this audio signal to the transceiver 4A (receiving transceiver) via wireless communications. The transceiver 4A receives and reproduces the audio signal.

In this manner, the relaying device 2A once buffers the audio signal received over the network 1, and then starts transferring the audio signal to the repeater 3A after it can confirm that the repeater 3A has reserved the wireless channel. Therefore, the beginning of the audio signal received by the receiving transceiver 4A is not clipped off.

Figure 3:
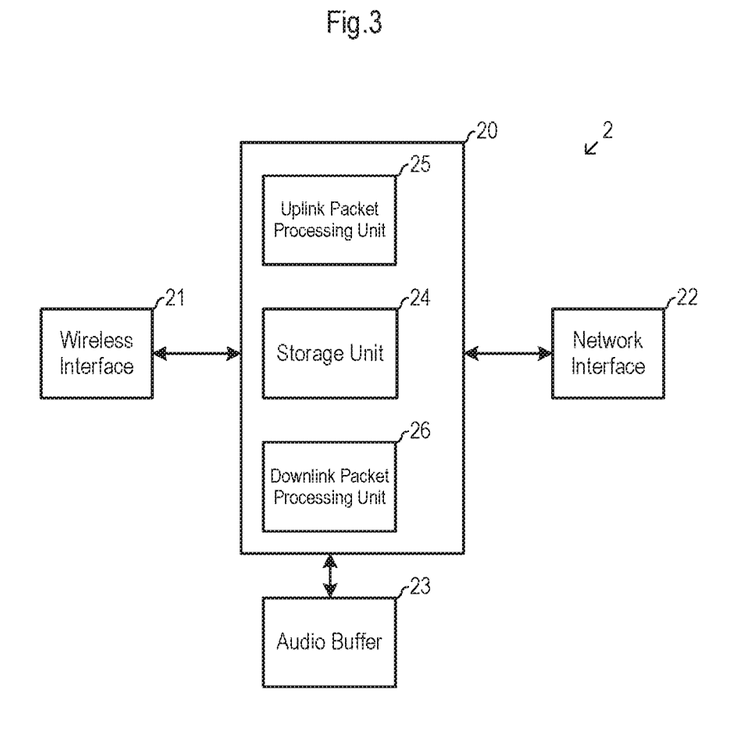
FIG. 3 is a block diagram of the relaying device in the communication system.

A description will be given of a relaying device 2 with reference to FIG. 3. The relaying device 2 has a control unit 20, a wireless interface 21, a network interface 22, and a voice buffer 23.

The wireless apparatus interface 21 is provided at a downstream end (or at an end on the side of the repeater 3). The wireless apparatus interface 21 is configured to enter uplink packets received from the repeater 3 into the control unit 20, and to send downlink packets received from the control unit 20 to the repeater 3. The network interface 22 is provided at an upstream end (or at an end on the side of the network 1). The network interface 22 is configured to enter into the control unit 20 downlink packets, the packets being received from a communication partner over the network 1, and to send uplink packets received from the control unit 20 to the network 1. The wireless apparatus interface 21 and the network interface 22 together may employ a connector that conforms to a physical layer of Ethernet™ and serve the purpose of physical and data link layers in digital communications.

The voice buffer 23 is a memory that buffers an audio signal in the RTP packet received over the network 1. The voice buffer 23 may be a FIFO memory or an ordinary RAM. In addition, while the voice buffer 23 is provided separately from the control 20 in FIG. 3, it may be built in the control unit 20.

The control unit 20 consists of a microcomputer, for example, and functionally includes a storage unit 24, an uplink packet processing unit 25, and a downlink packet processing unit 26.

The uplink packet processing unit 25 is configured to convert a format of the uplink audio packet received from the wireless apparatus interface 21 into an RTP packet, and transfer it to the network interface 22. Then, the uplink packet processing unit 25 is configured to write an IP address of a destination (receiving relaying device) into an IP header of the RTP packet and a port number of the destination into an UDP header of the RTP packet. In addition, while an audio signal of an audio packet received from the repeater 3 is encoded by, for example, G.711 or AMBE scheme, the uplink packet processing unit 25 may CODEC convert it into an encoding scheme such as G.726 or G.729 so that this can also be applied to an IP phone.

The downlink packet processing unit 26 is configured to extract only an audio signal (payload) from the RTP packet received from the network interface 22, to write it into the voice buffer 23, and to send to the repeater 3 a message requesting it to reserve a channel. When receiving, from the repeater 3, a reply indicating that a channel has been reserved, the downlink packet processing unit 26 reads the audio signal buffered in the voice buffer 23, and converts it into a format of the packet to be transferred to the repeater 3. It is also configured to CODEC convert the audio signal, as needed, and to transfer it to the wireless apparatus interface 21. In the CODEC conversion, contrary to the uplink packet processing unit 25, an audio signal encoded by the scheme such as G.726, G.729 and the like is converted into the encoding scheme such as G.711 or AMBE and the like.

Figure 4A:
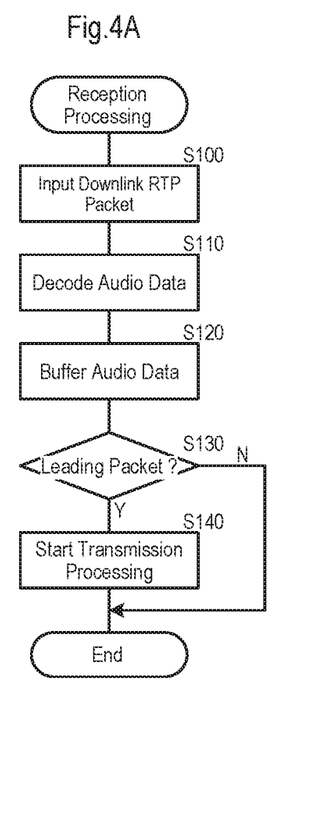
FIGS. 4(A), 4(B) are flowcharts of an operation of the relaying device.

An operation when the relaying device 2 receives a downlink packet will be described with reference to the flowchart of FIG. 4(A). A downlink packet is an RTP packet to be sent from other relaying device 2 by way of the network 1. FIG. 4(A) is a flowchart showing a reception processing operation to be executed whenever a downlink packet is received. When receiving a downlink packet from the network interface 22 (S100), the control unit 20 (downlink packet processing unit 26) decodes an audio signal from this packet (S110), and buffers the decoded audio signal into the voice buffer 23.

Figure 4B:
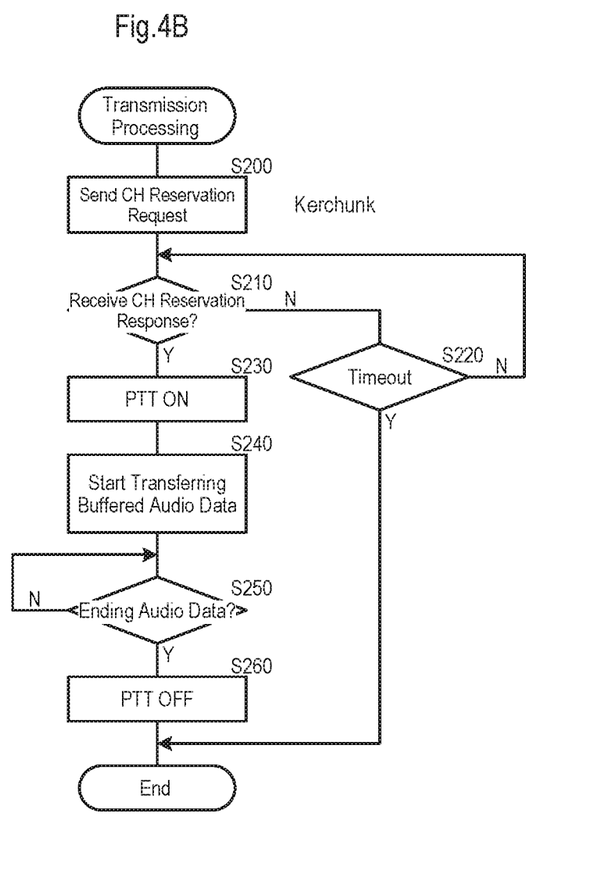

The control unit 20 is configured to determine whether this packet is a leading packet (S130). A leading packet is a leading packet of the packet train described above, and indicates that speech of a communication partner has started. When a received downlink packet is a leading packet (YES at S130), the control unit 20 starts a transmission processing operation as shown in FIG. 4(B) (S140). If it is not a leading packet (NO at S130), the control unit just directly terminates processing since the transmission processing operation has already been started.

FIG. 4(B) is a flowchart showing a transmission processing operation. The processing is executed for each packet train. Specifically, the processing starts at the leading packet in FIG. 2 and ends at the end of the packet train. First, the control unit 20 sends the repeater 3 a message of a channel reservation request (S200). Then, the control unit 20 waits until it receives a response from the repeater 3 that the channel has been reserved (channel reservation response) (S210) or until a timeout occurs as a result of the repeater 3 not responding to the message of the channel reservation request (S220).

If the control unit 20 receives the channel reservation response (YES at S210), the control unit 20 turns ON PTT of the repeater 3 (S230), and starts transferring the audio signal buffered in the voice buffer 23 to the repeater 3 (S240). The control unit 20 continues the transfer until the buffered audio signal ends (S250). When the audio signal ends (YES at S250), the control unit 20 turns off PTT (S260) and terminates the processing.

So far the case in which the present invention is applied to a communication system having a basic configuration has been described. In the following, a case in which the present invention is applied to a communication system using a relaying device 2 equipped with an individual calling function will be described. Note that in the following description, identical part numbers may be assigned to the parts which have already been described and that a description thereof may be omitted.

Figure 5:
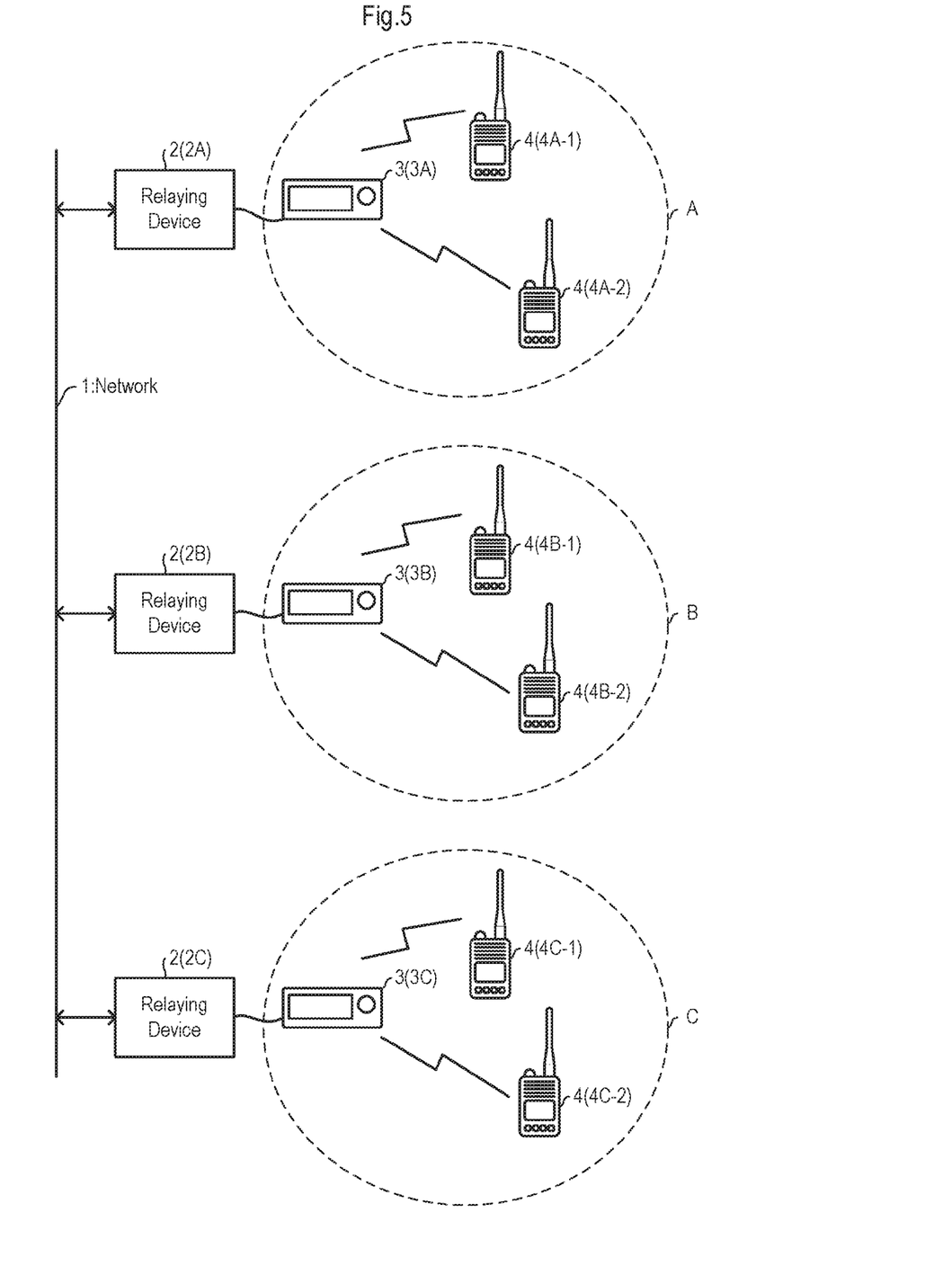
FIG. 5 shows a configuration of a communication system including relaying devices according to an embodiment of the present invention.

FIG. 5 is a configuration diagram of a communication system having a relaying device 2 capable of individual calling. This communication system uses a plurality of relaying devices connected to each other over a network 1 to enable communications among transceivers 4 (4A, 4B, 4C) present in different communication areas A to C.

The network 1 may employ LAN configured by Ethernet™ or the Internet. The one or more relaying device 2 (the three relaying devices in FIG. 1) are connected to the network 1. The relaying devices 2 (2A, 2B, 2C) cover different communication areas A, B, C, respectively. The relaying device 2 is connected to the repeater 3 (3A, 3B, or 3C) acting as a relay transceiver which is a stationary transceiver. The repeater 3 is a half-duplex communication device of so-called a push-to-talk (PTT) type. The one or more (the two transceivers in FIG. 5) transceiver 4 (4A-1, 2, 4B-1, 2, 4C-1, 2) is present in the communication areas of the repeaters 3. The repeater 3 and the transceiver 4 are digital transceivers that can communicate with each other.

Figure 6:
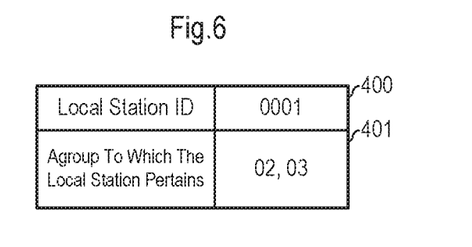
FIG. 6 shows a content stored in a wireless apparatus.

As illustrated in FIG. 6, the transceiver 4 stores an ID (wireless apparatus identification information) 400 to be used to identify a local station, and a group number 401 which is a number to be used to identify a group to which the local station belongs. If the ID 400 of its local station or the group number 401 thereof are embedded in a received digital signal as destination information, the transceiver 4 demodulates this digital signal into an audio signal, and outputs it from, for example, a speaker. Otherwise, if neither the ID 400 of its local station nor the group number 401 thereof is embedded in a received digital signal, the transceiver 4 discards this digital signal. Here, the ID 400 of a local station and the group number 401 thereof may be embedded in a received audio signal, for example, as a squelch code.

Figure 7:
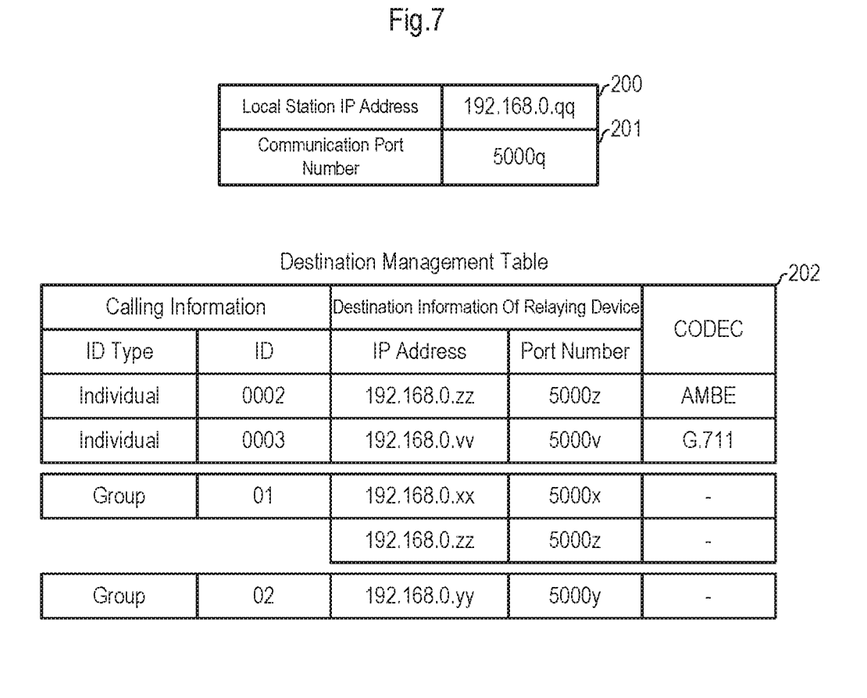
FIG. 7 shows a content stored in a storage unit of the relaying device.
Figure 8:
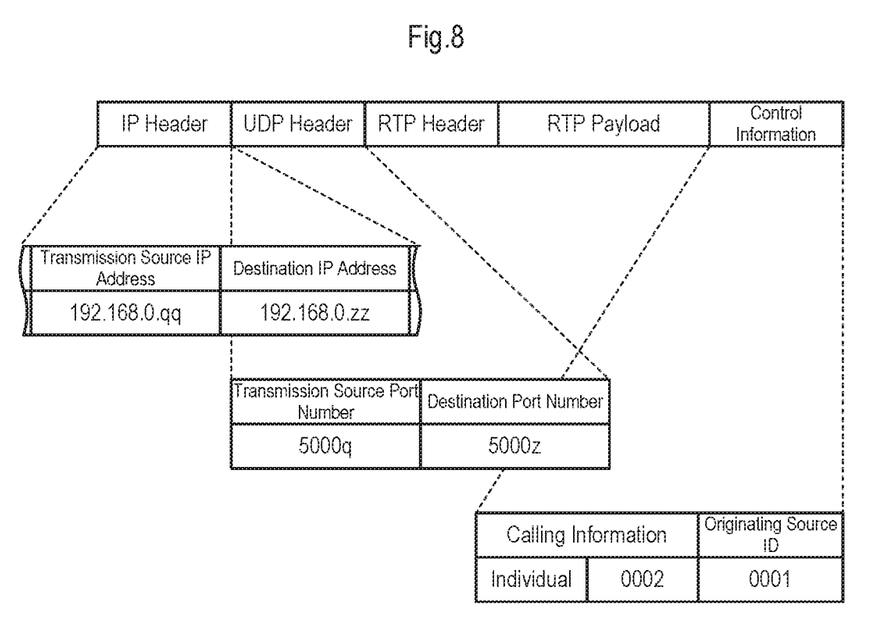
FIG. 8 is a view showing a configuration of an RTP packet.

FIG. 7 is a view showing a configuration of a storage unit 24 of the relaying device 2. In addition, FIG. 8 is a configuration diagram of an RTP (Real-time Transport Protocol) packet. Note that a configuration of the relaying device 2 is omitted and not shown because it is identical to that shown in FIG. 2. In the storage unit 24 of the control unit 20 are set a local station IP address storage area 200, a communication port number storage area 201, and a destination management table 202, as shown in FIG. 7. The destination management table 202 is a table for identifying an IP address and a port number of other relaying device 2, which is a destination of the audio packet, on the basis of the audio packet received from the repeater 3, specifically, calling information which is destination information contained in the audio signal sent by the transceiver 4 which is communicating with the repeater 3. Specifically, the destination management table 202 stores, as calling information for calling a predetermined transceiver 4, an ID type (type of whether calling is group calling or individual calling) and a calling ID thereof. While relating to this, the destination management table 202 stores an IP address and a port number of other relaying device 2 covering communication areas to which the transceiver 4 to be called by this calling information belongs. Note that if CODEC of the audio signal of the audio packet is converted into a format received from the repeater 3, a CODEC scheme of conversion destination is also stored in the destination management table 202.

As described above, the uplink packet processing unit 25 of the control unit 20 converts a format of an uplink audio packet received from the wireless apparatus interface 21 and transfers it to the network interface 22. Then, the uplink packet processing unit 25 reads calling information embedded in this uplink audio packet and searches the destination management table 202 with the calling information, to read a corresponding IP address and port number. The read IP address is written as a destination address into an IP header of an RTP packet configured as shown in FIG. 8 by format conversion, and the read port number is written as a destination port number into the UDP header. Note that an IP address of this relaying device 2 is written into a column of a transmission source IP address of the IP header, and a port number to be used in the relaying device 2 is written into a column of a transmission source port number of the UDP header. Then, following RTP payload (as a part of RTP payload), the calling information and an originator ID (ID of the transceiver 4 that sends the audio signal) embedded in the audio packet are written.

In addition, as described above, the downlink packet processing unit 26 of the control unit 20 receives an RTP packet sent from other relating device 2 over the network 1, coverts a format thereof, and transfers it to the repeater 3. Then, the downlink packet processing unit 26 reads calling information (ID type and ID) written into the RTP packet, and writes it into the audio packet to be transferred to the repeater 3.

Figure 9:
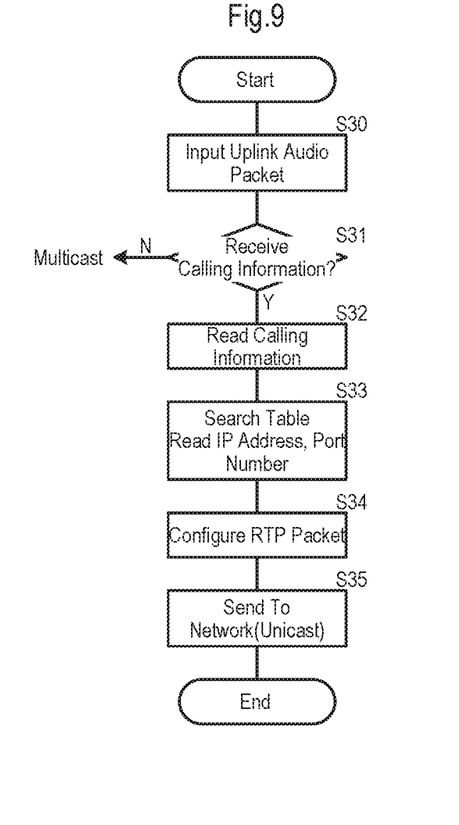
FIG. 9 is a flowchart of an operation of the relaying device.

An operation when the relaying device 2 receives an uplink packet will be described with reference to the flowchart in FIG. 9. When an uplink audio packet is received from the wireless apparatus interface 21 (S30), the relaying device 2 determines whether or not the calling information is contained in this packet (S31). If the calling information is not contained (NO at S31), the relaying device 2 converts this audio packet into a multicast RTP packet, considering that it is overall calling, and sends it to the network interface 22.

If the calling information is contained in the audio packet (YES at S31), the relaying device 2 reads this calling information (S32), searches the destination management table 202 with the read calling information, and reads an IP address and a port number of a destination (S33). Then, an RTP packet, as shown in FIG. 8, having this IP address and the port number as a destination port number is created (S34). As described above, the calling information is written into the RTP packet. The created RTP packet is sent to the network interface 22 (S35). The network interface 22 sends this RTP packet. Since a specific destination IP address is written into the RTP packet, it is sent to the relaying device at that destination IP address by unicast.

In this manner, an IP address (including a port number) corresponding to calling information to be embedded in an audio signal is stored in the destination management table 202. By determining a destination IP address of an audio signal using the destination management table 202 when an audio signal (audio packet) is entered, the packet can be transferred to a correct relay destination even when a plurality of relaying destinations (relaying device 2) over the network 1 are present.

In addition, writing calling information in an IP packet (RTP packet) and sending it make it possible to perform selective calling (individual calling or group calling) on the relay destination transceiver 4 even when communications of the transceiver 4 are relayed by the network 1.

Figure 10A:
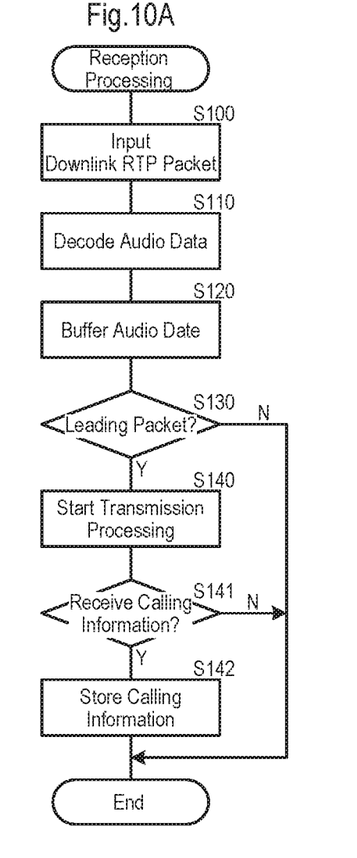
FIGS. 10(A), 10(B) are flowcharts of an operation of the relaying device.

An operation when a relaying device 2 receives a downlink packet will be described with reference to the flowchart of FIG. 10(A). In this flowchart, same processing steps as the flowchart of FIG. 4(A) are assigned with same S No. FIG. 10(A) is a flowchart showing a reception processing operation to be executed whenever a downlink packet is received. When receiving a downlink packet from the network interface 22 (S100), the control unit 20 (downlink packet processing unit 26) decodes audio signal from this packet (S110), and buffers the decoded audio signal into the voice buffer 23 (S120).

Figure 10B:
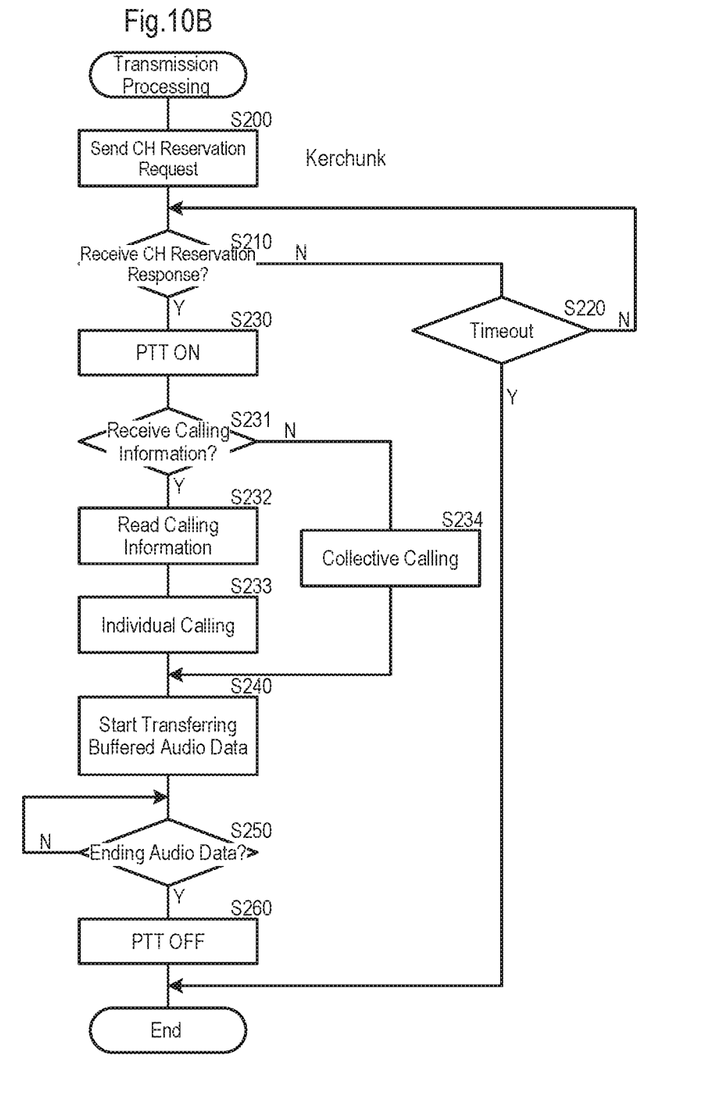

In addition, the control unit 20 determines whether this packet is a leading packet (S130). When the received downlink packet is a leading packet (YES at S130), the control unit starts a transmission processing operation as shown in FIG. 10(B) (S140). When the received downlink packet is not a leading packet (NO at S130), the processing is finished as it is because the transmission processing operation has already been started. When the received downlink packet is a leading packet (YES at S130), the control unit 20 further determines whether calling information is contained in the packet (S141). If calling information is contained in the packet (YES at S141), the control unit stores the calling information in the storage unit 24 (S142).

FIG. 10(B) is a flowchart showing a transmission processing operation. This processing is executed for every packet train. First, a message of channel reservation request is sent to the repeater 3 (S200). Then, the control unit 20 waits until it receives a response from the repeater 3 that the channel has been reserved (channel reservation response) (S210) or until a timeout occurs as a result of the repeater 3 not responding to the message of the channel reservation request (S220).

If the control unit 20 receives the channel reservation response (YES at S210), the control unit 20 turns ON PTT of the repeater 3 (S230), and determines whether calling information is stored (S231). If calling information is stored (YES at S231), the control unit reads the calling information (S232). After instructing the repeater 3 to perform individual calling with this calling information (S233), the control unit starts transferring the audio signal buffered in the voice buffer 23 to the repeater 3 (S240). In addition, if the calling information is not stored (NO at S231), the control unit starts transferring the audio signal buffered in the voice buffer 23 to the repeater 3 (S240) after instructing the repeater 3 to perform collective calling (S234). Note that as a result of calling being performed, an audio signal is received by the transceiver 4 with the beginning not clipped off, since the receiving transceiver 4 opens squelch and waits for arrival of the audio signal.

The control unit continues the transfer until the audio signal which buffers the transfer of the audio signal to the repeater 3 ends. When the audio signal ends (YES at S250), the control unit turns off PTT (S260) and terminates the processing.

In the above embodiments, while a timeout occurs when a certain period of time elapses with no channel reservation response received, following transmission of a channel reservation request, a timeout may not occur. In addition, when a timeout occurs, a channel reservation request may be further resent.

REFERENCE NUMERALS 1 network
2 relaying device
3 repeater (wireless apparatus)
4 transceiver

What is claimed is:

1. A relaying device that connects two different audio communication systems, one of the systems being a transceiver system in which one transceiver wirelessly exchanges an audio signal with another transceiver via radio waves, and the other of the systems being a network communication system exchanging the audio signal through the network, the relaying device comprising:
a wireless device interface that
is connected to a repeater of the transceiver system, and
receives/transmits a first-form packet containing the audio signal to which a calling information specifying a communication partner is added from/to the transceiver through the repeater;
a network interface that
is connected to the network, and
receives/transmits a second-form packet containing the audio signal and the calling information from/to a network device connected to the network;
a destination management table in which the calling information and addresses, which are unique codes to identify the network devices placed on the network, are stored, each piece of the calling information being assigned to one of the addresses, and
a control unit that converts the first-form packet and the second-form packet, wherein
the control unit comprises a uplink packet processing unit and a downlink packet processing unit
the uplink packet processing unit, when the first-form packet is input from the wireless device interface,
determines one of the addresses as a determined address identifying one of the network devices by referring to the destination management table with the calling information added to the first-form packet, generates the second-form packet by adding the determined address and containing the audio signal contained in the first-form packet and the calling information added to the first-form packet as a payload, and inputs the second-form packet into the network interface, and the downlink packet processing unit, when the second-form packet is input from the network interface, generates the first-form packet by containing the audio signal contained in the second form packet and adding the calling information contained in the second-form packet and deleting the address added to the second-form packet, and inputs the first-form packet into the wireless device interface.

2. The relaying device according to claim 1, wherein the uplink packet processing unit converts an encoding scheme of the audio signal contained in the first-form packet into another encoding scheme used in the communication over the network when generating the second-form packet from the first-form packet, and, the downlink packet processing unit converts the encoding scheme of the audio signal contained in the second-form packet into the encoding scheme used between the repeater and the transceiver when generating the first-form packet from the second-form packet.

3. A communication system, comprising:

a first relaying device described in claim 1, a first repeater and a first transceiver performing wireless communication with the first repeater in a first communication area; and, a second relaying device described in claim 1, a second repeater and at least one second transceiver performing wireless communication with the second repeater in a second communication area, wherein the first relaying device and the second relaying device are connected each other via a network, the first transceiver sends a first-form packet containing an audio signal and a calling information specifying the second transceiver, the first repeater inputs the first-form packet into the first relaying device, the first relaying device converts the first-form packet into a second-form packet and sends the second-form packet into the network, when the second-form packet is received from the network, the second relaying device converts the second-form packet into the first-form packet and inputs the first-form packet into the second repeater, the second repeater sends the first-form packet wirelessly and, the second transceiver receives the first-form packet and the specified transceiver only reproduce the audio signal.

4. The communication system according to claim 3, wherein the first relaying device converts an encoding scheme of the audio signal contained in the first-form packet into the encoding scheme used in the communication over the network, when converting the first-form packet received from the first repeater into the second-form packet and, the second relaying device converts the encoding scheme of the audio signal contained in the second-form packet into the encoding scheme used in the communication between the second repeater and the designated second transceiver when converting the second-form packet received from the first relaying device into the first-form packet addressed to the designated second transceiver.

5. A communication method that is executed in a relaying device that connects two different audio communication systems, one of the systems being a transceiver system in which one transceiver wirelessly exchanges an audio signal with another transceiver via radio waves, and the other of the systems being a network communication system in which the audio signal is exchanged between network devices through a network, the method comprising:

a) when receiving a first-form packet used for the transceiver system containing an audio signal and a calling information specifying a communication partner from the transceiver;

a1) determining a determined address of the communication partner identifying one of the network devices by referring to a destination management table with the calling information contained in the first-form packet, a2) converting the first-form packet into a second-form packet used for the network communication system by adding the determined address and containing the audio signal and the calling information;

a3) transmitting the second-form packet on the network;

b) when receiving the second-form packet used for the network communication system from the network;

b1) converting the second-form packet into the first-form packet by containing the audio signal contained in the second-form packet and adding the calling information contained in the second-form packet, and deleting the address added to the second-form packet; and b2) transmitting the first-form packet wirelessly through the repeater.

6. The communication method according to claim 5, further comprising:

converting an encoding scheme of the audio signal contained in the first-form packet into the encoding scheme used for the network communication system when converting the first-form packet into the second-form packet; and converting the encoding scheme of the audio signal contained in the second-form packet into the encoding scheme used for the transceiver system when converting the second-form packet into the first-form packet.

* * * * *